Feb. 28, 1956 H. R. WENGER 2,736,428
GLOVE COMPARTMENT PAD
Filed Nov. 20, 1953

Harvey R. Wenger
INVENTOR.

United States Patent Office 2,736,428
Patented Feb. 28, 1956

2,736,428

GLOVE COMPARTMENT PAD

Harvey R. Wenger, Sabetha, Kans.

Application November 20, 1953, Serial No. 393,387

1 Claim. (Cl. 206—72)

This invention relates to new and useful improvements and structural refinements in pads, and the principal object of the invention is to provide a pad of the character herein described, which may be conveniently and effectively employed in the glove compartment of automobiles and similar vehicles for the purpose of sustaining the contents of such compartments in a neatly arranged condition and thereby preventing the same from rolling, rattling, and the like.

Some of the advantages of the invention reside in its simplicity of construction, in its efficient operation and in its adaptability to economical manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
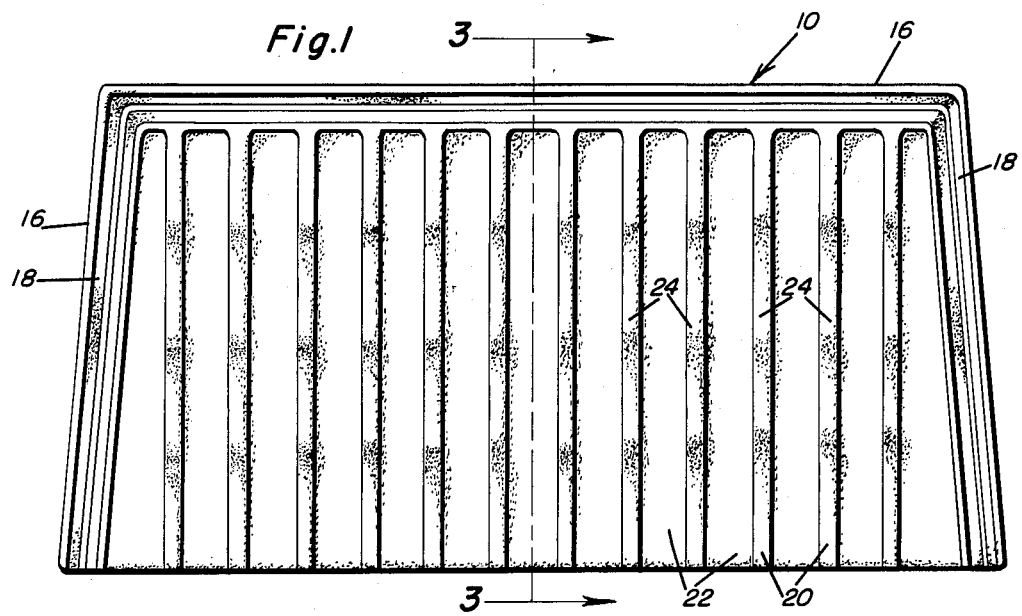
Figure 1 is a top plan view of the invention.
Figure 2:
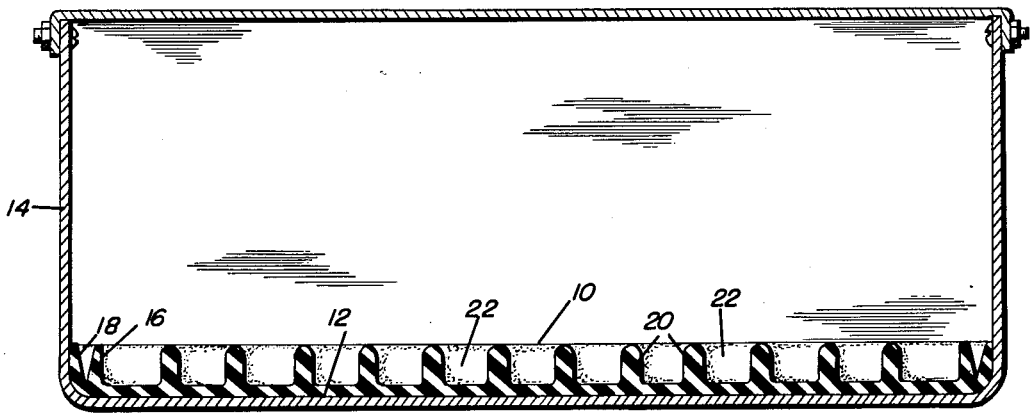
Figure 2 is a vertical sectional view illustrating the invention in position in a glove compartment.

Referring now to the accompanying drawings in detail, the pad is designated generally by the reference character 10 and is formed from suitable flexible material such as rubber, or the like.

The pad 10 is adapted to be positioned on the bottom 12 of a glove compartment 14, the pad being of such size that it snugly fits into the glove compartment with its side edges contacting the side walls of the compartment, as will be clearly understood.

The flexible character of the pad permits the same to be partly folded to facilitate its passage in and out of the glove compartment through the customary narrow door with which the compartment is usually equipped.

In any event, it will be observed that the pad 10 is provided at the side and rear edges thereof with an upstanding marginal rim 16 which, in turn, is formed with a substantially V-shaped groove 18 for the reception of upstanding articles such as letters, envelopes, and the like. Inasmuch as the rim 16 is disposed in adjacent relation to the side and rear walls of the glove compartment, any articles positioned in the groove 18 will be effectively supported in an upstanding position, with the upper edges thereof leaning against the walls of the compartment while their lower edge portions are disposed or seated in the groove.

The pad 10 is also provided with a series of upstanding, transversely spaced, forwardly and rearwardly extending ribs 20 which define therebetween a series of trough-shaped channels 22 which are suitable for the reception of slender articles such as pencils, pens, and the like.

Figure 3:
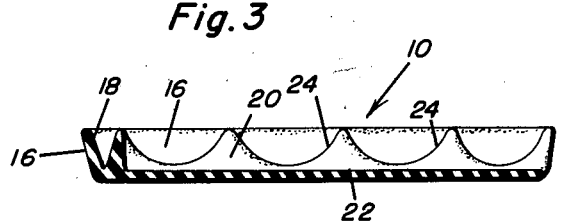
Figure 3 is a transverse sectional view taken substantially in the plane of the line 3—3 in Figure 1.

Moreover, as is best shown in Figure 3, the ribs 20 are provided with a series of transversely aligned, substantially semi-circular notches or recesses 24 which coact to afford seats for any relatively long articles such as may be positioned transversely on the pad.

By virtue of the keeper groove 18, channels 22 and recesses 24, various articles positioned on the pad in the glove compartment will be prevented from rolling, rattling, and the like.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A pad of resilient material insertable in an automobile glove compartment through the front thereof and conforming to the shape of said compartment, upstanding resilient rims integral with the side and rear marginal portions of the pad and yieldingly and frictionally engageable with the walls of the compartment, and a plurality of spaced, parallel ribs integral with the pad and extending longitudinally from the rear marginal rim to the front of said pad, said ribs defining longitudinal channels open at their front ends for the slidable insertion and removal of articles, said ribs having transversely aligned recesses in their upper portions for the reception of additional articles, said rims being of a material thickness and having substantially V-shaped grooves therein for wedgingly receiving and frictionally retaining flat articles.

References Cited in the file of this patent

UNITED STATES PATENTS

| D. 148,431 | Lund | Jan. 20, 1948 |
| D. 151,047 | Jensen | Sept. 21, 1948 |
| D. 166,734 | Chandler | May 13, 1952 |
| 1,711,412 | Hines | Apr. 30, 1929 |
| 1,941,922 | Worth | Jan. 2, 1934 |
| 2,018,651 | Bates | Oct. 29, 1935 |
| 2,230,709 | Walters | Feb. 4, 1941 |
| 2,659,485 | Duley et al. | Nov. 17, 1953 |